United States Patent [19]

Collins

[11] Patent Number: 5,326,229
[45] Date of Patent: Jul. 5, 1994

[54] INTEGRAL AIR SUSPENSION COMPRESSOR AND ENGINE AIR PUMP

[75] Inventor: Ronald J. Collins, Dearborn, Mich. 48128

[73] Assignee: Ford Motor Company, Dearborn, Mich.

[21] Appl. No.: 82,638

[22] Filed: Jun. 28, 1993

[51] Int. Cl.$^5$ .................. F04B 23/10; B60G 11/27; F01N 3/22
[52] U.S. Cl. ..................... 417/201; 417/18; 417/26; 417/278; 417/287; 417/350; 60/307; 180/68.3; 280/711
[58] Field of Search .................. 417/18, 26, 201, 278, 417/287, 350, 302, 199.1; 60/307, 284; 180/68.3; 280/711

[56] References Cited

U.S. PATENT DOCUMENTS

| | | |
|---|---|---|
| 2,845,875 | 8/1958 | Corbett . |
| 2,921,528 | 1/1960 | Muller ........................ 103/6 |
| 3,369,364 | 2/1968 | Ayers, Jr. et al. ............ 60/54.5 |
| 3,672,793 | 6/1972 | Yowell ....................... 417/350 |
| 3,771,921 | 11/1973 | Rohde et al. ................ 417/12 |
| 3,818,702 | 6/1974 | Woo ............................ 60/307 |
| 3,924,408 | 12/1975 | Beiswenger et al. .......... 60/307 |
| 4,024,710 | 5/1977 | Zelle . |
| 4,076,275 | 2/1978 | Hiruma . |
| 4,360,222 | 11/1982 | Fisher ........................ 280/711 |
| 4,558,886 | 12/1985 | Straub ....................... 280/711 |
| 4,621,982 | 11/1986 | Schulz et al. ............... 417/201 |
| 4,656,687 | 4/1987 | Wei . |
| 4,832,579 | 5/1989 | Norton . |
| 5,131,227 | 7/1992 | Iseman . |
| 5,135,065 | 8/1992 | Kawasaki et al. . |

FOREIGN PATENT DOCUMENTS

| | | | |
|---|---|---|---|
| 354438 | 2/1990 | European Pat. Off. | ......... 280/711 |
| 60-22012 | 2/1985 | Japan . | |

Primary Examiner—Richard A. Bertsch
Assistant Examiner—Roland G. McAndrews, Jr.
Attorney, Agent, or Firm—Roger L. May; Raymond L. Coppiellie

[57] ABSTRACT

An assembly is disclosed for supplying compressed air to both an engine and an air suspension of a motor vehicle. The assembly comprises a direct current electric motor, a centrifugal air pump, and a piston pump. The motor has a shaft extending outwardly from opposite sides of the motor, with the centrifugal pump being driven by one end of the shaft and the piston pump being driven by the other end of the shaft. The centrifugal pump produces high volumes of air at low pressure required by the engine, while the piston pump produces low volumes of air at high pressure required by the air suspension. Bypass valves are provided to selectively divert the air provided by the pumps to the atmosphere.

11 Claims, 1 Drawing Sheet

INTEGRAL AIR SUSPENSION COMPRESSOR AND ENGINE AIR PUMP

TECHNICAL FIELD

This invention relates to air suspension compressors and engine air pumps for motor vehicles and, more particularly, to an air suspension compressor and an engine air pump that are driven by a common direct current electric motor.

BACKGROUND ART

Pneumatic suspension systems of motor vehicles typically require air or gas to be supplied to inflatable or bellows-type springs at relatively high pressures, but at relatively low volume. A specialized pump or compressor is normally provided to produce an air flow with these characteristics, and the air suspension compressor is generally powered by means such as a direct current electrical motor dedicated to this purpose. For example, U.S. Pat. No. 4,738,454 to Watanabe, assigned to the assignee of the present invention and hereby incorporated by reference, discloses an air suspension system having an air compressor which may be mounted under the floor of the vehicle.

Conversely, the engine of the motor vehicle may require air at relatively low pressure and high volume for engine emission applications, particularly when excess air is needed during engine start-up conditions. Therefore, a compressor having operating characteristics different than those of the air suspension compressor, as well as its own power source, is conventionally required to supply engine air.

SUMMARY OF THE INVENTION

The present invention is an integral assembly for supplying compressed air to both an engine and an air suspension of a motor vehicle. The assembly comprises a direct current electric motor having a shaft extending outwardly from opposite sides of the motor, a centrifugal air pump, and a piston pump. The centrifugal air pump is driven by one end of the shaft, and produces high volumes of air at low pressure required by the engine. The piston pump is driven by the other end of the shaft, and produces low volumes of air at high pressure required by the air suspension.

A suspension control module is provided in communication with the direct current electric motor and with each of two bypass valves. The first bypass valve is disposed in a line between the centrifugal air pump and the engine, and is in selective communication with the atmosphere. The second bypass valve is disposed in a line between the piston pump and the air suspension, and is also in selective communication with the atmosphere. The suspension control module can either selectively disable the direct current electric motor, open the first bypass valve to divert the air provided by the centrifugal air pump to the atmosphere, or open the second bypass valve to divert the air provided by the piston pump to the atmosphere.

Accordingly, it is an object of the present invention to provide an assembly of the type described above including a compressor for supplying air to the air suspension and a compressor for supplying air to the engine which are both driven by the same power source.

Another object of the present invention is to provide an assembly for supplying compressed air of the type described above which includes bypass valves in the lines between the pumps and their respective downstream components for selectively venting to the atmosphere the air provided by the pumps.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
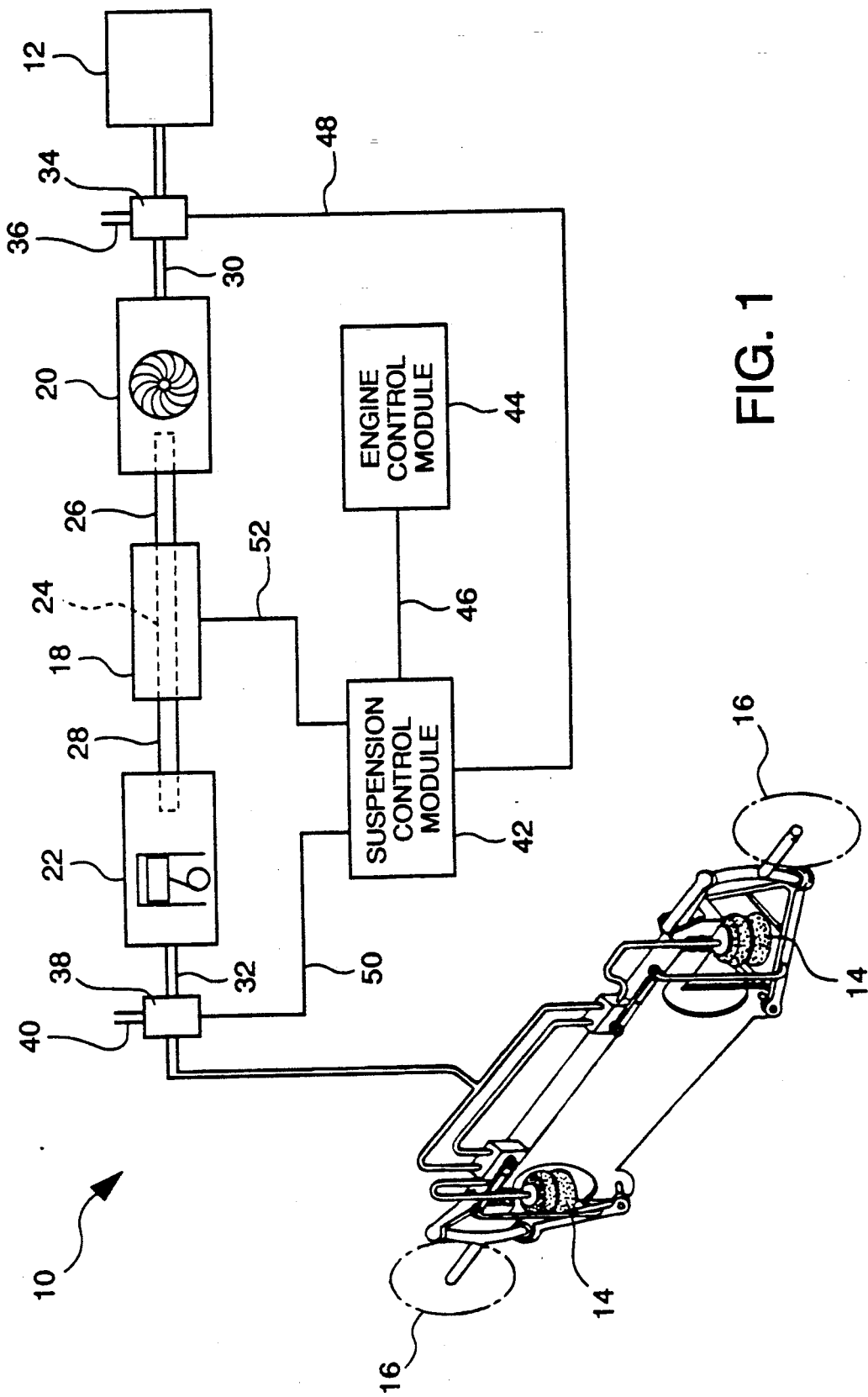
FIG. 1 is a schematic illustration of an assembly according to the present invention for supplying compressed air to both an engine and an air suspension of a motor vehicle.

With reference to the drawing, the preferred embodiments of the present invention will be described. FIG. 1 shows an integral assembly 10 for supplying compressed air to both an engine 12 and to an air suspension, which includes for example inflatable bellows-type air or gas springs 14 disposed proximate the wheels 16, of a motor vehicle. The assembly 10 comprises a direct current (DC) electric motor 18, a centrifugal air pump 20, and a piston pump 22.

The DC motor 18 has a dual arbor shaft 24 including ends 26 and 28 extending outwardly from opposite sides of the DC motor, and is powered by the vehicle battery and/or the vehicle alternator (not shown), as is well known. The centrifugal air pump 20 is driven by one end 26 of the shaft 24 of the motor 18, and functions as a compressor means for producing high volumes of air at low pressure required by the engine 12. Typically, the engine 12 utilizes these large volumes of low pressure air for its emissions controls, particularly during the first ninety seconds or so after engine start-up. The centrifugal air pump 20 therefore generally supplies this air at or near atmospheric pressure, although it should be understood that air at a higher pressure can be supplied.

The centrifugal air pump 20, also known as a vortex or squirrel cage pump, is preferably of the vane type having a radial, axial or mixed flow impeller mounted on the shaft 24 which directs the incoming air flow against stationary diffusion vanes. A centrifugal air pump suitable for this application is manufactured by Coltech Industries of Warren, Mich. The centrifugal air pump 20 delivers the air produced therein to a line 30 in communication with the engine 12.

The piston pump 22 is driven by the other end 28 of the shaft 24 of the DC motor 18, and functions as a compressor means for producing low volumes of air at high pressure required by the air suspension. Generally, each air spring 14 has a maximum volume of about one liter, which must be intermittently replenished while the vehicle is in motion and the air suspension is functioning. The piston pump 22 preferably operates at about 3400 revolutions per minute, at a power of about 210 watts. A piston pump suitable for this application is manufactured by Tokico of Burea, Ky. The piston pump 22 delivers the air produced therein to a line 32 in communication with the air springs 14 of the air suspension.

A first bypass valve 34 is disposed in the line 30 between the centrifugal air pump 20 and the engine 12, and is in selective communication with the atmosphere through a vent line 36. A second bypass valve 38 is disposed in the line 32 between the piston pump 22 and the air springs 14 of the air suspension, and, similarly to the first bypass valve 34, is in selective communication with the atmosphere through a vent line 40.

A suspension control module 42 is provided in communication with an engine control module 44 through a communication line 46, and is also in communication with the bypass valves 34 and 38. Through a bypass control line 48, the suspension control module 42 can open the first bypass valve 34 to divert to the atmosphere the air provided by the centrifugal air pump 20. Through a bypass control line 50, the suspension control module 42 can open the second bypass valve 38 to divert to the atmosphere the air provided by the piston pump 22.

The suspension control module 42 is also in communication with the motor 18 through a line 52, and is programmed to selectively disable the motor, and hence the centrifugal air pump 20 and the piston pump 22, when no air is required for either the engine or suspension applications. Stated conversely, the motor 18 is turned on only when either application requires air. The engine 12, for example, normally requires air only during the initial engine start-up period. For the suspension, the duty cycle is normally about 20 seconds every 10 minutes. Thus, both the centrifugal air pump 20 and the piston pump 22 are operated whenever the DC motor 18 is turned on, but air from either pump can be diverted from flowing to the non-requesting application through either the first bypass valve 34 or second bypass valve 38 when its function is no longer necessary to the operation of the vehicle.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. An assembly for supplying compressed air to both an engine and an air suspension of a motor vehicle, the assembly comprising:
    a motor having a shaft;
    first compressor means driven by the shaft of the motor for producing high volumes of air at low pressure required by the engine, and for delivering the air produced by the first compressor to a line in communication with the engine; and
    second compressor means driven by the shaft of the motor for producing low volumes of air at high pressure required by the air suspension, and for delivering the air produced by the second compressor means to a line in communication with the air suspension.

2. The assembly of claim 1 wherein the first compressor means comprises a centrifugal air pump.

3. The assembly of claim 1 wherein the second compressor means comprises a piston pump.

4. The assembly of claim 1 wherein the shaft extends outwardly from opposite sides of the motor, and the first and second compressor means are respectively disposed on opposite sides of the motor.

5. The assembly of claim 1 further comprising a suspension control module in communication with the motor such that the motor can be selectively disabled.

6. The assembly of claim 1 further comprising a first bypass valve in the line between the first compressor means and the engine, the first bypass valve being selectively in communication with the atmosphere.

7. The assembly of claim 6 further comprising a suspension control module in communication with the first bypass valve such that the first bypass valve can be opened to divert the air provided by the first compressor means to the atmosphere.

8. The assembly of claim 1 further comprising a second bypass valve in the line between the second compressor means and the air suspension, the second bypass valve being selectively in communication with the atmosphere.

9. The assembly of claim 8 further comprising a suspension control module in communication with the second bypass valve such that the second bypass valve can be opened to divert the air provided by the second compressor means to the atmosphere.

10. The assembly of claim 1 wherein the motor is a direct current electric motor.

11. An assembly for supplying compressed air to both an engine and an air suspension of a motor vehicle, the assembly comprising:
    a direct current electric motor having a shaft extending outwardly from opposite sides of the motor;
    a centrifugal air pump driven by one end of the shaft of the motor for producing high volumes of air at low pressure required by the engine, and for delivering the air produced by the first compressor to a line in communication with the engine;
    a piston pump driven by the other end of the shaft of the motor for producing low volumes of air at high pressure required by the air suspension, and for delivering the air produced by the second compressor means to a line in communication with the air suspension;
    a first bypass valve in the line between the centrifugal air pump and the engine, the first bypass valve being selectively in communication with the atmosphere;
    a second bypass valve in the line between the piston pump and the air suspension, the second bypass valve being selectively in communication with the atmosphere; and
    a suspension control module in communication with the direct current electric motor, first bypass valve and second bypass valve such that the direct current electric motor can be selectively disabled, the first bypass valve can be opened to divert the air provided by the centrifugal air pump to the atmosphere, or the second bypass valve can be opened to divert the air provided by the piston pump to the atmosphere.

* * * * *